US009646417B1

(12) United States Patent
Sowadski et al.

(10) Patent No.: US 9,646,417 B1
(45) Date of Patent: *May 9, 2017

(54) AUGMENTED REALITY SYSTEM FOR FIELD TRAINING

(75) Inventors: Clifford B. Sowadski, Eureka, MO (US); Robert James Lechner, Saint Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 1504 days.

This patent is subject to a terminal disclaimer.

(21) Appl. No.: 13/016,014

(22) Filed: Jan. 28, 2011

(51) Int. Cl.
G06T 19/00 (2011.01)
G06F 3/00 (2006.01)
G06F 3/01 (2006.01)
G02B 27/01 (2006.01)

(52) U.S. Cl.
CPC ............ G06T 19/006 (2013.01); G06F 3/005 (2013.01); G06F 3/011 (2013.01); G02B 2027/014 (2013.01)

(58) Field of Classification Search
CPC ... G06F 3/011; G06F 3/005; G02B 2027/014; G02B 2027/0178; G06T 19/006

USPC ............... 434/29, 30, 40, 43, 44, 46
See application file for complete search history.

(56) References Cited

U.S. PATENT DOCUMENTS 7,773,202 B2    8/2010  Crawford et al.

OTHER PUBLICATIONS

Robert Armfiled, "Joint Terminal Attack Controller: Separating Fact From Fiction", Apr. 2003, Air Command and Staff College Air University, pp. 1-30.*

* cited by examiner

Primary Examiner — Jack Yip
(74) Attorney, Agent, or Firm — Yee & Associates, P.C.

(57) ABSTRACT

A method and apparatus for displaying simulation objects. A simulation of a live environment is run while a training device is present in the live environment. A set of simulation objects in the simulation is identified from a number of simulation objects in the simulation using a position of the training device in which the set of simulation objects is visible to the training device in the live environment. Simulation data is generated for the set of simulation objects. The simulation data is sent to the training device in the live environment.

20 Claims, 15 Drawing Sheets

AUGMENTED REALITY SYSTEM FOR FIELD TRAINING

BACKGROUND INFORMATION

1. Field

The present disclosure relates generally to training and, in particular, to a method and apparatus for performing training exercises in the field. Still more particularly, the present disclosure relates to a method and apparatus for performing training exercises in the field using a simulation environment.

2. Background

Training exercises are often performed by personnel using equipment. The training may be performed to familiarize and train personnel to use the equipment.

For example, training exercises are often performed by joint terminal attack controllers (JTACs). A joint terminal attack controller is a person who directs the action of various air operations. A joint terminal attack controller may be located in a forward position in a live environment, such as a field, with respect to an air operation being performed. This person performs forward air control, which includes operations to guide aircraft such that attacks by these aircraft hit intended targets and not other areas. For example, a joint terminal attack controller may direct the action of combat aircraft engaged in air support, as well as other offensive air operations.

Currently, training of joint terminal air controllers includes classroom training and field training. The classroom training may include the use of simulations and training devices in which a virtual environment is presented to the person. These simulations may be as simple as a single screen projection on which the simulation is displayed, or as complicated as a dome projection system with simulated or actual field equipment. Classroom training, however, may not provide the desired experience as compared to actual training in the field.

Training in a field involves using actual field equipment on a training range. With this type of training, live platforms are used. For example, actual aircraft, ground vehicles, and other equipment are present on the field for use in the training exercise. With these exercises, a person performs different procedures to guide aircraft to targets.

Performing training sessions in the field may be more expensive and time consuming than desired. For example, the persons training to become joint terminal air controllers may need to be transported to a field where aircraft, ground vehicles, and other platforms are available. Also, the aircraft, ground vehicles, and other platforms may need to be moved to the field. In some cases, the aircraft, ground vehicles, and/or other platforms may not be available or may not be available at desired times. The location, movement, and scheduling of the personnel and platforms needed for training may be complex, time consuming, and more expensive than desired.

Therefore, it would be advantageous to have a method and apparatus that takes into account at least some of the issues discussed above, as well as possibly other issues.

SUMMARY

In one advantageous embodiment, a method is provided for displaying simulation objects. A simulation of a live environment is run while a training device is present in the live environment. A set of simulation objects in the simulation is identified from a number of simulation objects in the simulation using a position of the training device in which the set of simulation objects is visible to the training device in the live environment. Simulation data is generated for the set of simulation objects. The simulation data is sent to the training device in the live environment.

In another advantageous embodiment, an apparatus comprises a rendering system. The rendering system is configured to identify a set of simulation objects in a simulation from a number of simulation objects in the simulation of a live environment using a position of a training device in the live environment. The set of simulation objects is visible to the training device in the live environment and the simulation of the live environment runs while the training device is present in the live environment. The rendering system is configured to generate simulation data for the set of simulation objects. The rendering system is configured to send the simulation data to the training device in the live environment.

In yet another advantageous embodiment, an apparatus comprises a viewing system and a video system. The viewing system is configured to present a live environment to an operator of the viewing system. The viewing system is located in the live environment. The video system is configured to display a set of simulation objects on the viewing system with the live environment using simulation data received from a rendering system that is configured to identify the set of simulation objects visible to the viewing system in the live environment from a number of simulation objects in a simulation of the live environment using a position of the viewing system. The video system is configured to generate the simulation data for the set of simulation objects. The video system is configured to send the simulation data to the video system in the live environment.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that performing training using simulators that simulate the environment and platforms may not provide the desired experience for the persons in training. Further, the different advantageous embodiments also recognize and take into account that in some cases, regulations and/or certification standards may set an amount of time in which training is to be performed in a live environment.

For example, the different advantageous embodiments recognize and take into account that certification of trainees may be required and that the certification may require some number of hours in both classroom and in field training. The different advantageous embodiments recognize and take into account that it would be desirable to reduce the time and expense needed to perform training in a live environment.

The different advantageous embodiments recognize and take into account that the costs associated with persons traveling to a live environment, such as, for example, a field having platforms, such as aircraft and trucks, available at the field may be more expensive than desired. Additionally, the different advantageous embodiments recognize and take into account that the availability of platforms may not meet desired training dates or schedules. As a result, training persons in a live environment may take longer than desired or may not occur as quickly as desired.

Thus, the different advantageous embodiments provide a method and apparatus for training using an augmented reality system. In one advantageous embodiment, a simulation of a live environment is performed while a training device is present in the live environment. In other words, a training device is present in a live environment and a simulation is performed of that live environment at the same time. A set of simulation objects in the simulation that are visible to the training device in the live environment is identified using a position of the training device. Simulation data is generated for the set of simulation objects. The simulation data is sent to the training device in the live environment.

Figure 1:
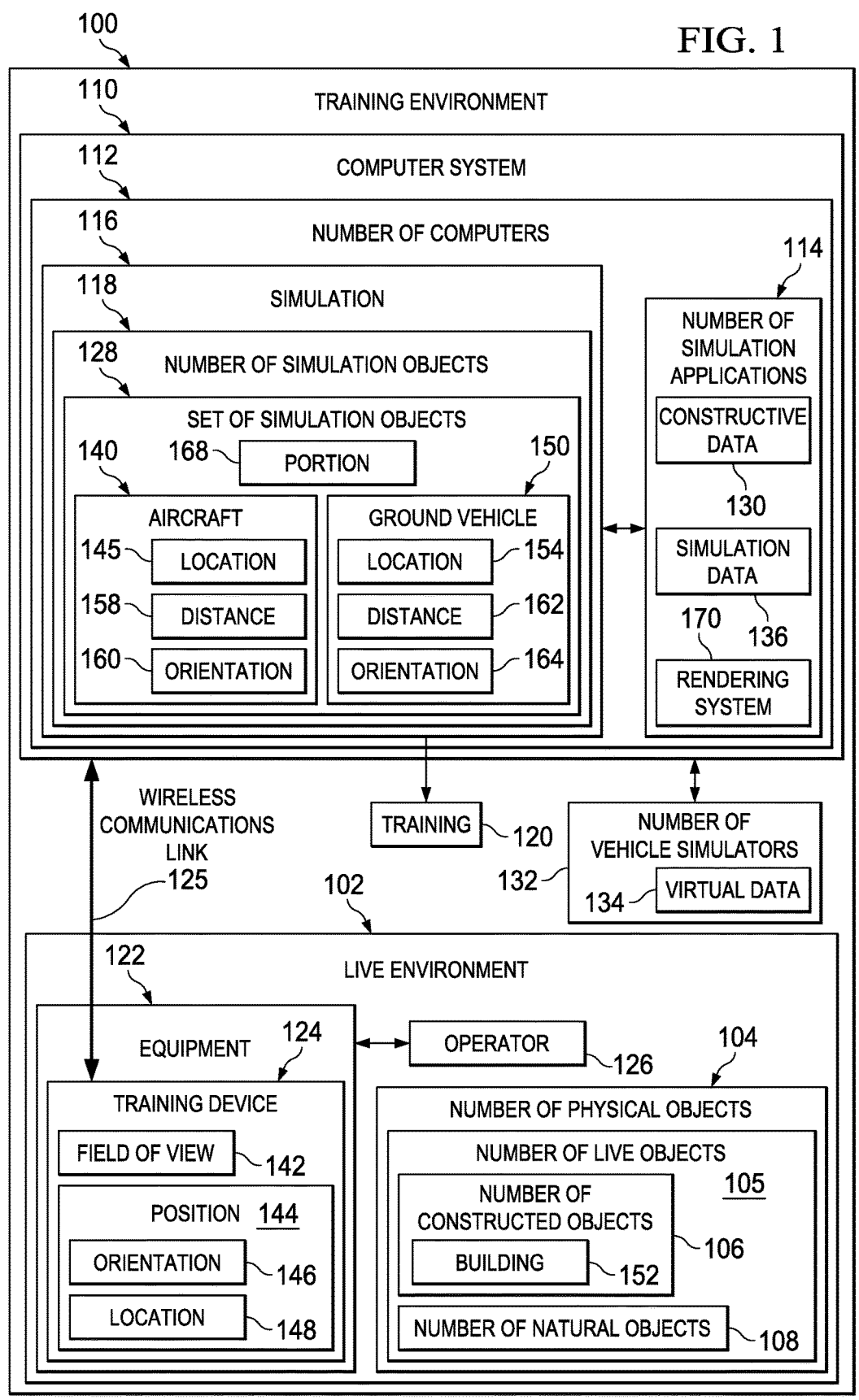
FIG. 1 an illustration of a training environment in accordance with an advantageous embodiment.

With reference now to FIG. 1, an illustration of a training environment is depicted in accordance with an advantageous embodiment. In this illustrative example, training environment 100 includes live environment 102.

As depicted, live environment 102 includes number of physical objects 104. As used herein, a number, with reference to items, means one or more items. For example, number of physical objects 104 is one or more physical objects.

In these illustrative examples, an object in number of physical objects 104 may include any object that is physically present in live environment 102. Number of physical objects 104 may also be referred to as number of live objects 105. A live object is any object that is physically present in live environment 102 and is not a simulation object. Number of physical objects 104 may include at least one of number of constructed objects 106 and number of natural objects 108.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Number of constructed objects 106 is one or more objects manufactured or constructed by people. Number of natural objects 108 is one or more objects that naturally occur in live environment 102. For example, number of constructed objects 106 may include at least one of a building, an aircraft, a car, a truck, a dam, and other suitable types of objects. Further, number of natural objects 108 may include at least one of trees, a mountain, a lake, a hill, a ravine, and other suitable types of objects.

In these illustrative examples, training environment 100 also includes computer system 110. Computer system 110 comprises number of computers 112. Number of computers 112 may be in communication with each other using wired and/or wireless communications links in these illustrative examples. Number of simulation applications 114 run on number of computers 112 in computer system 110.

In the depicted examples, an application is program code that performs a number of functions. An application may include a number of computer programs. An application also may include other components. These components include, for example, a dynamic link library, a library of functions, a configuration file, a log, a graphical user interface, application program interfaces, and other suitable components. An application may be, for example, without limitation, a word processor, a database, middleware, a plug-in, or a video game.

In these illustrative examples, number of simulation applications 114 run simulation 116 to perform training 120 in training environment 100. As depicted, number of simulation applications 114 runs simulation 116 to simulate live environment 102. Simulation 116 of live environment 102 includes a simulation of number of live objects 105 in live environment 102.

In performing simulation 116 of live environment 102, number of simulation objects 118 may be generated by number of simulation applications 114. Number of simulation objects 118 may be generated as part of performing training 120 in live environment 102.

In the depicted example, training 120 is performed with equipment 122 and training device 124 in live environment 102. Equipment 122 includes training device 124. In these illustrative examples, training device 124 is in communication with computer system 110 using wireless communications link 125.

Simulation 116 is run by number of simulation applications 114, while equipment 122 and training device 124 are operated in live environment 102. In these illustrative examples, simulation 116 is run, while operator 126 uses equipment 122 with training device 124 to perform training 120 in live environment 102.

In these illustrative examples, number of simulation applications 114 identifies set of simulation objects 128 in number of simulation objects 118 that can be viewed by training device 124. In particular, set of simulation objects 128 may be viewed by operator 126 using training device 124 associated with equipment 122.

As used herein, a set, used with reference to an item, means no items or one or more items. In other words, the set may be a null or empty set in some cases. For example, set of simulation objects 128 means no simulation objects or one or more simulation objects in these illustrative examples.

In this manner, operator 126 may perform training 120 in live environment 102 in which live environment 102 may include number of live objects 105. As part of training 120, number of simulation objects 118 is simulated with set of simulation objects 128 being viewed by operator 126 in live environment 102 during training 120. Number of simulation objects 118 is selectively viewed by operator 126. Set of simulation objects 128 is identified and presented to operator 126 through training device 124 in these depicted examples. In this manner, operator 126 is provided interaction with number of simulation objects 118 in a live training environment.

In these examples, number of simulation applications 114 performs simulation 116, while operator 126 uses equipment 122 with training device 124 in live environment 102. In providing number of simulation objects 118, number of simulation applications 114 generates constructive data 130 in running simulation 116. Constructive data 130 is data generated by a software application to simulate an object in number of simulation objects 118. The object simulated may be, for example, without limitation, an aircraft, a ground vehicle, a missile site, a missile, or some other suitable type of object.

A simulation object in number of simulation objects 118 is a computer-generated representation of a live object. In other words, a simulation object is an imitation of a real world or live object.

Additionally, training environment 100 also may include number of vehicle simulators 132. Number of vehicle simulators 132 may simulate vehicles, such as, for example, without limitation, an aircraft, a ground vehicle, or some other suitable type of vehicle. Number of vehicle simulators 132 is in communication with computer system 110 in these illustrative examples. Number of vehicle simulators 132 generates and sends virtual data 134 to number of simulation applications 114 running on computer system 110.

Number of simulation applications 114 processes virtual data 134 for use in simulation data 136. For example, virtual data 134 may include information used to create simulation objects in number of simulation objects 118 to represent number of vehicle simulators 132. Further, virtual data 134 may also include information about the position, orientation, and movement of number of vehicle simulators 132 within simulation 116.

As depicted, number of simulation applications 114 generates simulation data 136 and sends simulation data 136 to training device 124 over wireless communications link 125. Simulation data 136, in these illustrative examples, may include information about simulation objects and their actions. For example, simulation data 136 may include information for identifying a location of a simulation object, a heading of a simulation object, an identification of a simulation object, and other suitable types of information.

In this manner, operator 126 may perform training 120 in live environment 102 with number of live objects 105 in which number of live objects 105 is supplemented with number of simulation objects 118. By performing simulation 116 of live environment 102, number of simulation applications 114 may include number of simulation objects 118 in place of number of live objects 105.

Live objects that may be logistically difficult to obtain, costly to use, or unavailable may be simulated in number of simulated objects 118 to provide training 120 on equipment 122. Some of the features in training 120 are provided by number of simulation applications 114 running simulation 116 of live environment 102, while equipment 122 and training device 124 are present in live environment 102. In this manner, greater interaction and a more realistic experience with less cost and/or logistics issues may be achieved by simulation objects, as compared to providing all objects as number of live objects 105.

In one illustrative example, number of simulation objects 118 includes aircraft 140. Number of simulation applications 114 determines whether aircraft 140 in number of simulation objects 118 is visible by training device 124.

In some illustrative examples, number of simulation applications 114 determines whether aircraft 140 is within field of view 142 of training device 124. Field of view 142 is the extent of live environment 102 that is observable by training device 124. In these illustrative examples, field of view 142 is simulated within simulation 116. This simulation of field of view 142 in simulation 116 is used by number of simulation applications 114 to identify set of simulation objects 128 from number of simulation objects 118.

Whether training device 124 can view aircraft 140 depends on whether aircraft 140 is in field of view 142 of training device 124. This determination may be made using position 144 of training device 124 and location 145 of aircraft 140. Position 144 includes orientation 146 and location 148 of training device 124 in these illustrative examples. Orientation 146 includes identification of parameters, such as pitch, roll, and yaw. Location 148 is a physical location of training device 124 in live environment 102. Location 148 may be described using, for example, latitude, longitude, and altitude.

In these illustrative examples, training device 124 sends position 144 to number of simulation applications 114. In this manner, number of simulation applications 114 may include training device 124 in simulation 116 of live environment 102.

If location 145 of aircraft 140 is within field of view 142 of training device 124, number of simulation applications 114 includes aircraft 140 in set of simulation objects 128. Otherwise, aircraft 140 cannot be seen by training device 124 and is not included in set of simulation objects 128.

As another illustrative example, ground vehicle 150 is another example of a simulation object in number of simulation objects 118, and building 152 is an example of a live object within number of live objects 105. In particular, building 152 is one example of a constructed object in number of constructed objects 106.

Number of simulation applications 114 determines whether ground vehicle 150 is in field of view 142 of training device 124 based on position 144 of training device 124 and location 154 of ground vehicle 150. If ground vehicle 150 is within field of view 142 of training device 124, ground vehicle 150 is included in set of simulation objects 128.

In these illustrative examples, aircraft 140 and ground vehicle 150 may move within simulation 116 of live environment 102 during training 120. As location 154 of ground vehicle 150 and location 145 of aircraft 140 changes, these two simulation objects may no longer be included in set of simulation objects 128 if they fall outside of field of view 142 of training device 124.

Further, the manner in which aircraft 140 and ground vehicle 150 are generated for display on training device 124 is based on distance 158 and orientation 160 of aircraft 140 and distance 162 and orientation 164 of ground vehicle 150. For example, as distance 158 and distance 162 increases, the size of aircraft 140 and ground vehicle 150 may decrease when displayed on training device 124.

Additionally, the view of portion of aircraft 140 depends on orientation 160 relative to position 144 of training device 124. For example, in some orientations, aircraft 140 may be displayed from a rear view, a bottom view, a side view, a perspective view, or some other view, depending on orientation 160 of aircraft 140. In a similar fashion, the manner in which ground vehicle 150 is displayed depends on orientation 164 of ground vehicle 150 relative to training device 124 in these examples.

Number of simulation applications 114 is configured to identify when portion 168 of set of simulation objects 128 within number of simulation objects 118 is obscured in field of view 142 of training device 124 by at least one of another simulation object and a live object within number of live objects 105 in live environment 102. Portion 168 may be one or more of set of simulation objects 128. Portion 168, in some cases, may include all of set of simulation objects 128.

A simulation object may be partially or fully obscured, depending on the position of the simulation object with respect to the live object or other simulation object.

For example, if portion 168 includes all of set of simulation objects 128, some simulation objects may be partially obscured and some simulation objects may be fully obscured. The partially obscured simulation objects are still displayed with respect to the portions of the simulation objects that are still seen. Simulation objects that are fully obscured are not displayed on training device 124.

Number of simulation applications 114 is configured to identify portions of a simulation object that are obscured by a live object based on the position of the simulation object. The simulation object that is obscured is then displayed in a manner that only presents the portion of the simulation object that is not obscured by the live object.

For example, as ground vehicle 150 moves relative to building 152, ground vehicle 150 may be partially or fully obscured by building 152 from field of view 142 of training device 124. If ground vehicle 150 is identified as being obscured by building 152, number of simulation applications 114 generates constructive data 130 for ground vehicle 150 such that only portions of ground vehicle 150 that can be seen are displayed on training device 124.

The obscured portion of the ground vehicle is not included in constructive data 130 for ground vehicle 150. As a result, ground vehicle 150 appears to be obscured by building 152.

For example, a portion of ground vehicle 150 may be behind building 152 from field of view 142 of training device 124. As a result, that portion of ground vehicle 150 is not seen in the display of ground vehicle 150 on training device 124.

If ground vehicle 150 moves, number of simulation applications 114 determines whether the portion of ground vehicle 150 obscured by building 152 increases or decreases. Constructive data 130 is generated for ground vehicle 150 to take into account the change in obstruction of ground vehicle 150 by building 152.

Further, operator 126 of training device 124 also may see simulation objects within set of simulation objects 128 that are generated to represent number of vehicle simulators 132. The simulation objects within set of simulation objects 128 that represent number of vehicle simulators 132 are generated using virtual data 134 from number of vehicle simulators 132. In this manner, set of simulation objects 128 in simulation 116 may include simulation objects that are controlled by number of simulation applications 114, number of vehicle simulators 132, or a combination of the two.

With this type of environment, trainees, such as operator 126, may perform more realistic training in live environment 102 without requiring live objects or as many live objects. As a result, the expense and time needed to schedule and move live objects to live environment 102 for training 120 may be reduced or eliminated.

The illustration of training environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, additional training devices may be present in addition to training device 124. These additional training devices may be used by other operators in live environment 102. In yet other illustrative examples, number of vehicle simulators 132 may not be included in training environment 100.

In the illustrative examples, number of simulation applications 114 may perform various operations in addition to running simulation 116 and identifying set of simulation objects 128. For example, number of simulation applications 114 also may record statistics or other information about training 120 performed by operator 126 and operators of number of vehicle simulators 132.

The different illustrative examples may be implemented within rendering system 170. In these illustrative examples, rendering system 170 may take the form of program code, hardware, or a combination of the two. For example, rendering system 170 may take the form of program code in number of simulation applications 114. As yet another example, in some advantageous embodiments, rendering system 170 may be implemented partially or wholly in hardware and may be a component separate from number of simulation applications 114. With this type of implementation, rendering system 170 may be in communication with number of simulation applications 114.

Figure 2:
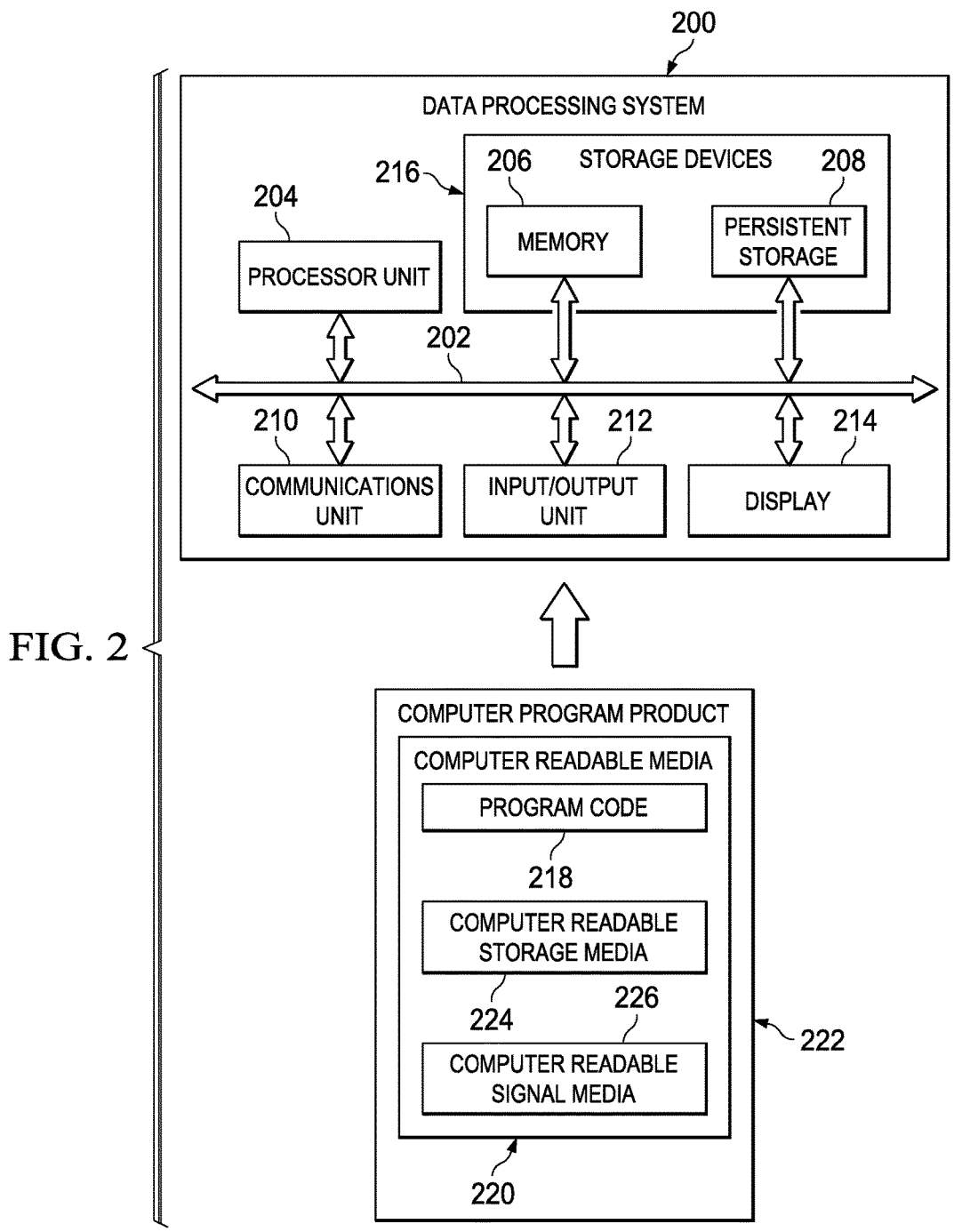
FIG. 2 an illustration of a data processing system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Data processing system 200 in FIG. 2 is an example of a data processing system that may be used to implement a computer in number of computers 112 in computer system 110 in FIG. 1. Further, data processing system 200 also may be used in number of vehicle simulators 132 and/or training device 124 in FIG. 1.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

In these examples, computer readable storage media 224 is a physical or tangible storage device used to store program code 218, rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications fabric 202.

Figure 3:
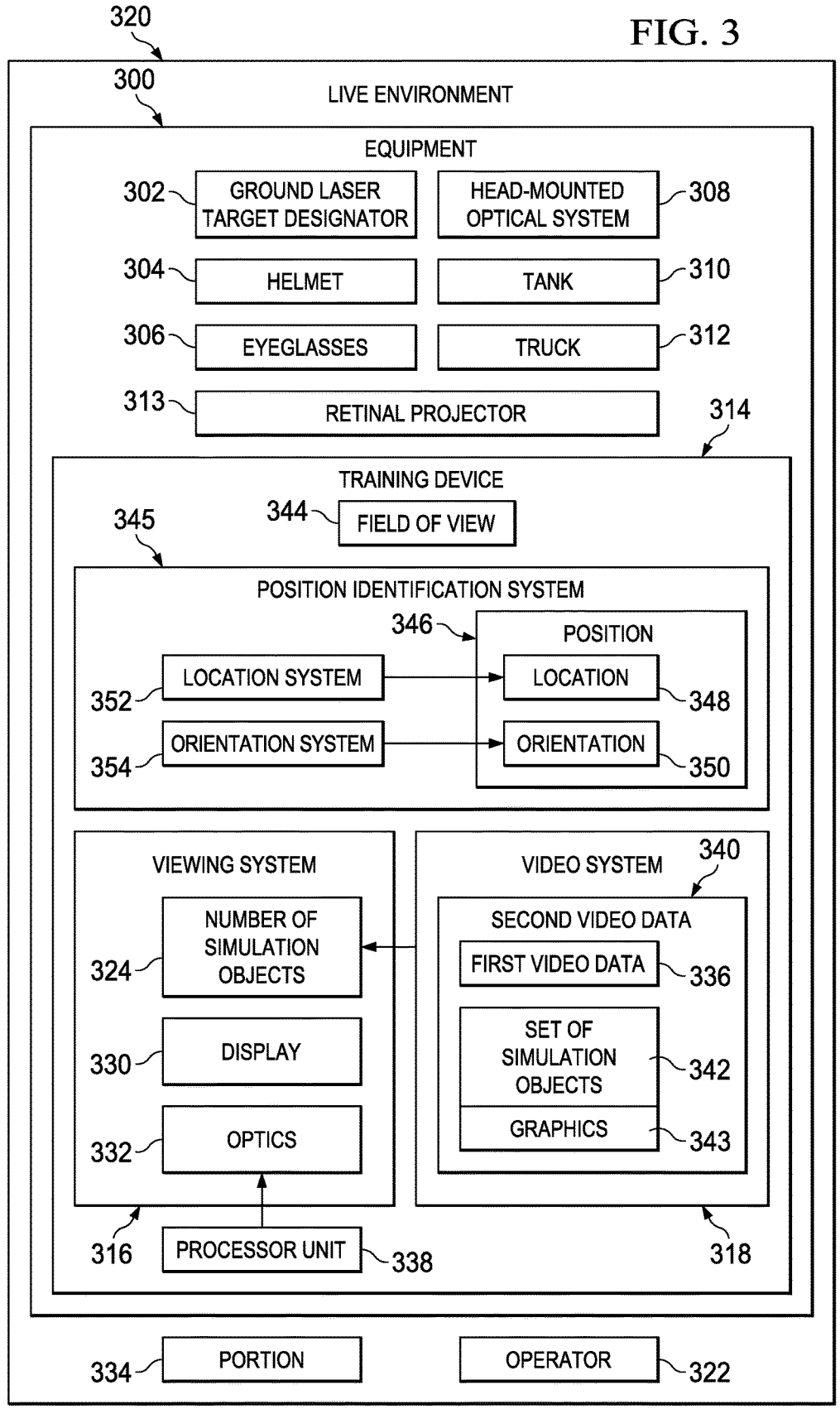
FIG. 3 is an illustration of equipment used in training in accordance with an advantageous embodiment.

With reference now to FIG. 3, an illustration of equipment used in training is depicted in accordance with an advantageous embodiment. In this illustrative example, equipment 300 is an example of one implementation for equipment 122 in FIG. 1.

In this illustrative example, equipment 300 may take various forms. For example, without limitation, equipment 300 may be ground laser target designator 302, helmet 304, eyeglasses 306, head-mounted optical system 308, tank 310, truck 312, retinal projector 313, and other suitable types of optical sensing equipment. For example, equipment 300 may include other equipment, such as, for example, aircraft optical targeting sensors, ground mapping RADAR, vehicle-mounted optical sighting and targeting systems, and/or other suitable types of equipment.

In this illustrative example, training device 314 is associated with equipment 300. Training device 314 is an example of one implementation for training device 124 in FIG. 1.

In this illustrative example, training device 314 includes viewing system 316, video system 318, and position identification system 345. Viewing system 316 is configured to present live environment 320, in which equipment 300 is located, to operator 322 of viewing system 316. Video system 318 is configured to display number of simulation objects 324 on viewing system 316 with live environment 320. Video system 318 may also be referred to as a video graphics system.

In these illustrative examples, viewing system 316 may take a number of different forms. For example, viewing system 316 may include at least one of display 330, optics 332, and other suitable devices. Display 330 may be a light emitting diode (LED) display on which portion 334 of live environment 320 that can be seen through optics 332 by training device 314 is presented.

Video system 318 is configured to generate first video data 336. First video data 336 is video data of live environment 320 in which training device 314 is located. In particular, processor unit 338 may direct light through optics 332 for portion 334 onto a sensor. Processor unit 338 or some other hardware component may convert the light into first video data 336.

In these illustrative examples, video system 318 is aligned with training device 314 such that the field of view for video system 318 corresponds to field of view 344 for training device 314. In other words, the field of view for video system 318 substantially aligns with the direction of gaze for training device 314. In this manner, first video data 336 substantially duplicates the portion of live environment 320 that is visible to training device 314.

Additionally, video system 318 is configured to send first video data 336 to number of simulation applications 114 or rendering system 170 in FIG. 1 for processing. Video system 318 is also configured to receive second video data 340 generated by number of simulation applications 114 in FIG. 1.

As illustrated, second video data 340 comprises first video data 336 with graphics 343 for set of simulation objects 342 identified from number of simulation objects 324. In other words, number of simulation applications 114 in FIG. 1 combines graphics 343 for set of simulation objects 342 with first video data 336 of live environment 320 to form second video data 340.

In this illustrative example, graphics 343 may include any number of graphical elements, graphical indicators, graphical drawings, and/or other suitable type of graphical objects that represent set of simulation objects 342.

Set of simulation objects 342 is objects from number of simulation objects 324 that can be seen by training device 314. In these illustrative examples, set of simulation objects 342 is in field of view 344 of training device 314.

In these illustrative examples, position identification system 345 generates position 346 of training device 314. In particular, position 346 is a position of viewing system 316 in training device 314. Position 346 comprises location 348 and orientation 350. Location system 352 in position identification system 345 is configured to identify location 348 of viewing system 316. Location system 352 may be implemented using a number of different types of devices. For example, location system 352 may be implemented using a global positioning system unit, an inertial measurement unit, a multilateration system, and other suitable types of systems.

Orientation system 354 is configured to identify orientation 350 of viewing system 316. Orientation system 354 may be implemented using a number of different devices. For example, without limitation, a gyroscope, a motion reference unit, accelerometers, an inertial measurement unit, and other suitable types of devices may be used. Position identification system 345 sends this information to number of simulation applications 114 and/or rendering system 170 in FIG. 1 for use in identifying and generating set of simulation objects 342.

In some illustrative examples, viewing system 316 may not include display 330. Instead, operator 322 views live environment 320 directly using optics 332. This type of viewing system may be present in equipment 300 that takes the form of helmet 304, eyeglasses 306, or other suitable types of equipment.

With this type of implementation, operator 322 sees live environment 320 through optics 332 in viewing system 316 without using display 330. With this type of implementation, video system 318 does not send first video data 336. Second video data 340 includes set of simulation objects 342 and information needed to display set of simulation objects 342 in the appropriate locations on optics 332. For example, the information may identify coordinates or particular locations on optics 332 where each of number of simulation objects 324 should be displayed with the presentation of live environment 320.

Additionally, second video data 340 includes graphics 343 for set of simulation objects 342. Graphics 343 may be the graphical elements used to represent set of simulation objects 342 on video system 318.

Video system 318 displays number of simulation objects 324 on viewing system 316 by displaying number of simulation objects 324 on optics 332. For example, optics 332 may be a lens or glass panel at which operator 322 looks to view live environment 320 from viewing system 316.

The illustration of equipment 300 with training device 314 is an example of one implementation for equipment 122 and training device 124 in FIG. 1. This illustration is not meant to imply physical or architectural limitations to the manner in which different advantageous embodiments may be implemented.

Figure 4:
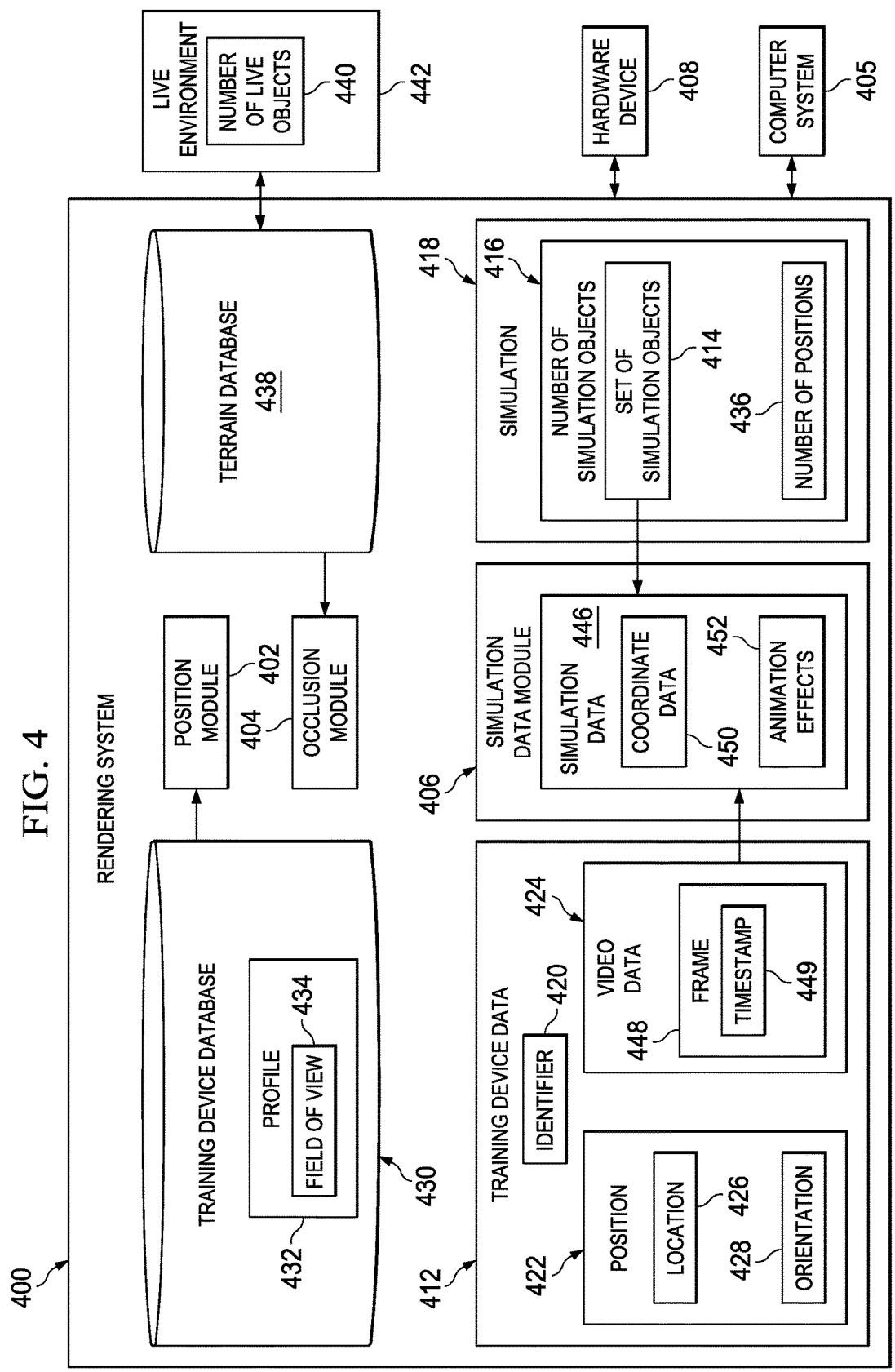
FIG. 4 is an illustration of a rendering system in accordance with an advantageous embodiment.

With reference now to FIG. 4, an illustration of a rendering system is depicted in accordance with an advantageous embodiment. In this illustrative example, rendering system 400 is an example of one implementation of rendering system 170 in FIG. 1. Rendering system 400 may be implemented in computer system 405 and/or as hardware device 408 in these illustrative examples. Computer system 405 may include one or more computers implemented using data processing system 200 in FIG. 2. Hardware device 408 may be implemented as circuits. In particular, hardware device 408 may include integrated circuits for position module 402 and occlusion module 404.

Rendering system 400 includes position module 402, occlusion module 404, and simulation data module 406 in these illustrative examples. In these illustrative examples, rendering system 400 receives training device data 412 from a training device, such as training device 314 in FIG. 3.

Training device data 412 is any data that may be used by rendering system 400 to identify set of simulation objects 414 from number of simulation objects 416 in simulation 418. For example, training device data 412 includes identifier 420, position 422, and video data 424.

Identifier 420 is used to identify the training device from which training device data 412 has been received. Identifier 420 may take a number of different forms. For example, without limitation, identifier 420 may be a name of the training device, a number, numbers and letters, or some other suitable system for identifying training devices. Position 422 includes location 426 and orientation 428 for the training device.

Further, video data 424 may include a video stream or sequence of images generated using a camera system or video camera system. Each image in video data 424 may be referred to as a frame.

As depicted, position module 402 obtains information about a training device from training device database 430 using identifier 420. For example, training device database 430 may include profile 432 for a training device corresponding to identifier 420.

Profile 432 is used to identify set of simulation objects 414 from number of simulation objects 416 in simulation 418. In this illustrative example, profile 432 includes field of view 434 for the training device identified by identifier 420. Profile 432 may also include other information, such as, for example, without limitation, zoom factor, rendering mode, and/or other suitable information. The rendering mode may be selected from one of, for example, infrared, electro-optical, night vision, laser firing, video filtering applied, or some other suitable type of rendering mode.

Still further, profile 432 may also include information about the capabilities of the training device to see through objects. For example, a training device may have the capability to see below ground, through obstructions, and/or see by penetrating through other objects. These types of training devices include, for example, without limitation, ground penetrating radar devices, sonar devices, x-ray devices, and/or other suitable types of devices.

Position module 402 identifies the position of number of simulation objects 416 in simulation 418. Based on position 422 and field of view 434 for the training device and number of positions 436 for number of simulation objects 416, position module 402 identifies which simulation object in number of simulation objects 416 can be seen by the training device. These identified simulation objects are included in set of simulation objects 414.

Additionally, occlusion module 404 determines whether an occlusion occurs for any of number of simulation objects 416. In these illustrative examples, occlusion module 404 uses terrain database 438 to determine whether any of number of live objects 440 in live environment 442 in which the training device is located obscure an object in set of simulation objects 414.

Terrain database 438 provides information about number of live objects 440 that may be present in live environment 442. For example, terrain database 438 may include information about buildings. A vehicle in set of simulation objects 414 may be partially or fully obscured by one of the buildings based on the position of the vehicle.

In some illustrative examples, number of live objects 440 may have devices configured to send position data to occlusion module 404. For example, a tank in number of live objects 440 may have a device configured to generate position data for the tank and send the position data to occlusion module 404. This position data may include, for example, without limitation, the location, the orientation, and the type of tank. Occlusion module 404 may use this position data to determine when a simulation object is blocked or partially blocked by the tank. Further, occlusion module 404 may use this position data to determine when a simulation object blocks or partially blocks the tank.

Additionally, in these illustrative examples, occlusion module 404 may be also configured to measure the distance between the training device and each simulation object in number of simulation objects 416. For example, occlusion module 404 uses a simulated laser in live environment 442 to identify the distance between the training device and a simulation object. Simulated lasers cause fewer undesired effects, as compared to actual laser devices, such as, for example, laser pointers and ground laser target designators (GLTDs). These types of actual laser devices emit high power laser energy that can cause undesired effects to human eyes.

Further, occlusion module 404 also determines whether a simulation object is blocked by another simulation object in set of simulation objects 414. In other words, an occlusion of one simulation object may be caused by another simulation object in these particular examples.

Occlusion module 404 uses set of simulation objects 414 because those simulation objects are ones that can be potentially seen by the training device. In other words, a portion of number of live objects 440 or a portion of set of simulation objects 414 may block or occlude a portion of the field of view for the training device.

When occlusion module 404 determines that a portion of field of view 434 is blocked, simulation data module 406 generates simulation data 446 containing set of simulation objects 414. Simulation data 446 is sent to the training device for use in displaying set of simulation objects 414 on the training device. In this manner, simulation data 446 for set of simulation objects 414 may then be displayed on a presentation of the view of live environment 442 for the operator of the training device.

Further, each frame, such as frame 448, in video data 424, may be associated with a timestamp, such as timestamp 449. These timestamps may allow particular simulation objects in set of simulation objects 414 to be overlaid or combined with the correct set of frames in video data 424, depending on simulation 418 that is run.

In the illustrative examples, simulation data 446 includes video data 424 with set of simulation objects 414. For example, set of simulation objects 414 may be overlaid or combined with frame 448 in video data 424. In this manner, simulation data 446 may be displayed to the user of the training device.

Further, in these depicted examples, simulation data 446 may also include animation effects 452. Animation effects 452 include animated graphical elements that are displayed to represent events occurring to simulation objects. The events may be, for example, an explosion, a termination of a simulation object, or some other type of event. Animation effects 452 may include, for example, smoke, debris, dust, an explosion, fire, and/or other suitable animation effects.

As one illustrative example, a projectile weapon is one example of a simulation object in number of simulation objects 416. Simulation 418 launches the projectile weapon at a target. When the projectile weapon reaches the target, simulation 418 terminates the projectile weapon with an event, such as an explosion. This explosion may be displayed to the user of the training device with animation effects 452, such as fire, smoke, and/or debris.

The illustration of rendering system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, simulation data 446 may not include video data 424 with set of simulation objects 414. Instead, set of simulation objects 414 may include coordinate data 450 identifying the location in the display of the training device at which particular simulation objects in set of simulation objects 414 should be displayed with the live environment.

Figure 5:
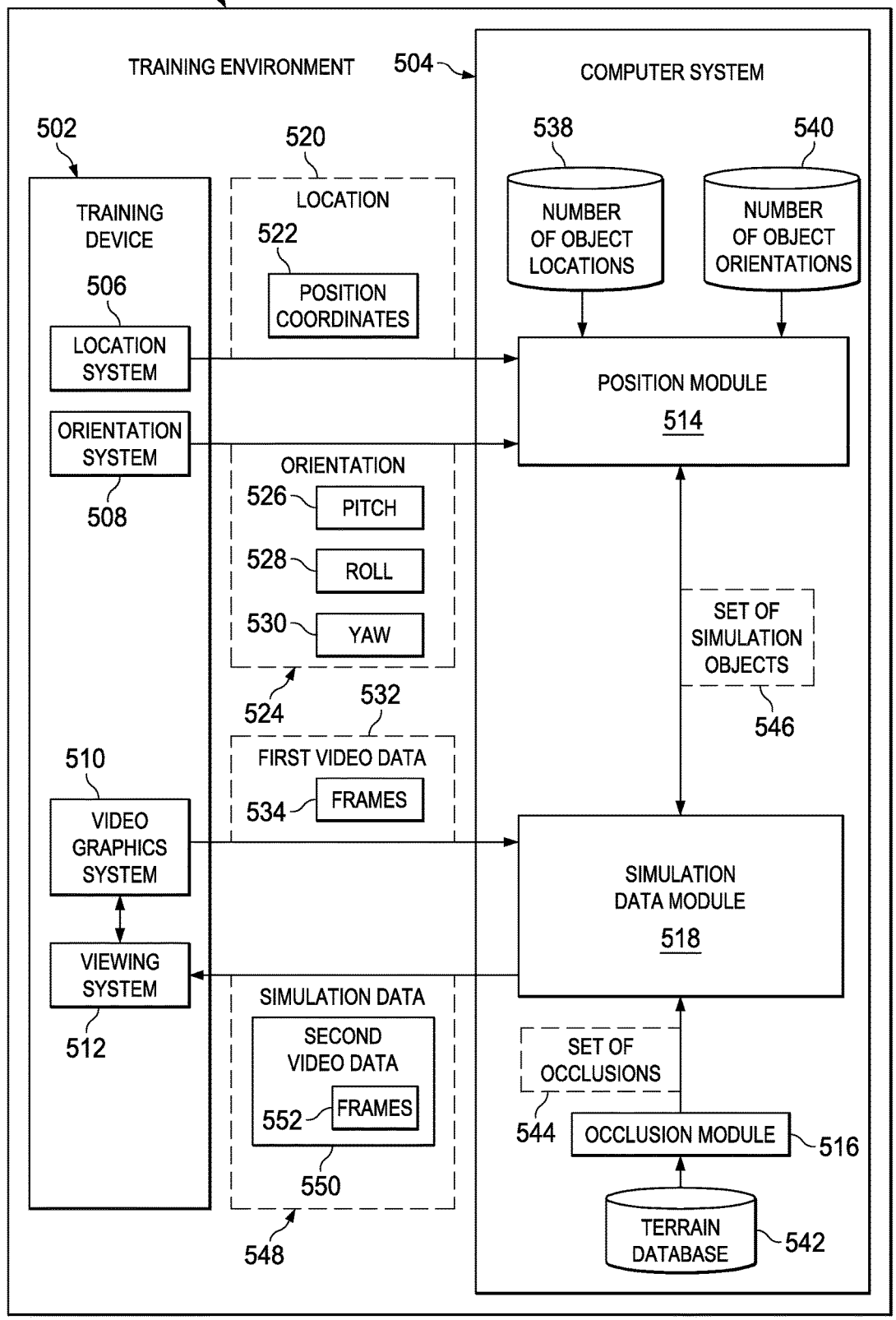
FIG. 5 is an illustration of data flow in displaying simulation objects in a live environment in accordance with an advantageous embodiment.

With reference now to FIG. 5, an illustration of data flow for displaying simulation objects in a live environment is depicted in accordance with an advantageous embodiment. In this illustrative example, training environment 500 comprises training device 502 and computer system 504. Training device 502 may be implemented using training device 314 in FIG. 3. Computer system 504 may be implemented using computer system 110 in FIG. 1. In these illustrative examples, training device 502 includes location system 506, orientation system 508, video graphics system 510, and viewing system 512. Computer system 504 includes position module 514, occlusion module 516, and simulation data module 518.

In this illustrative example, location system 506 sends location 520 to position module 514. Location 520, in these examples, takes the form of position coordinates 522. Position coordinates 522 may be, for example, longitude and latitude. Orientation system 508 sends orientation 524 to position module 514. In these examples, orientation 524 takes the form of pitch 526, roll 528, and yaw 530. Video graphics system 510 sends first video data 532 to simulation data module 518. In these examples, first video data 532 comprises frames 534.

Position module 514 uses location 520 and orientation 524 to identify a set of objects that can be seen by training device 502. This identification is made using number of object locations 538 for a set of vehicles. Based on number of object locations 538 for the number of simulation objects in the simulation, the set of simulation objects may be identified.

Additionally, number of object orientations 540 includes orientations for the number of simulation objects. Number of object orientations 540 may be used to identify the manner in which the set of vehicles is to be rendered or displayed.

Occlusion module 516 uses terrain database 542 to determine whether any of the set of simulation objects are obscured. Terrain database 542 is a database of the terrain for live objects in the live environment.

Occlusion module 516 sends set of occlusions 544 to simulation data module 518. Position module 514 sends set of simulation objects 546 to simulation data module 518. Simulation data module 518 uses set of simulation objects 546 instead of set of occlusions 544 to generate simulation data 548, which is sent to video graphics system 510.

In this example, simulation data 548 comprises second video data 550, which includes frames 552. Second video data 550 is displayed by video graphics system 510 on viewing system 512 in these illustrative examples.

The illustration of training environment 500 in FIG. 5 is an example of one manner in which data flow may occur in displaying simulation objects with a live environment on a training device.

Figure 6:
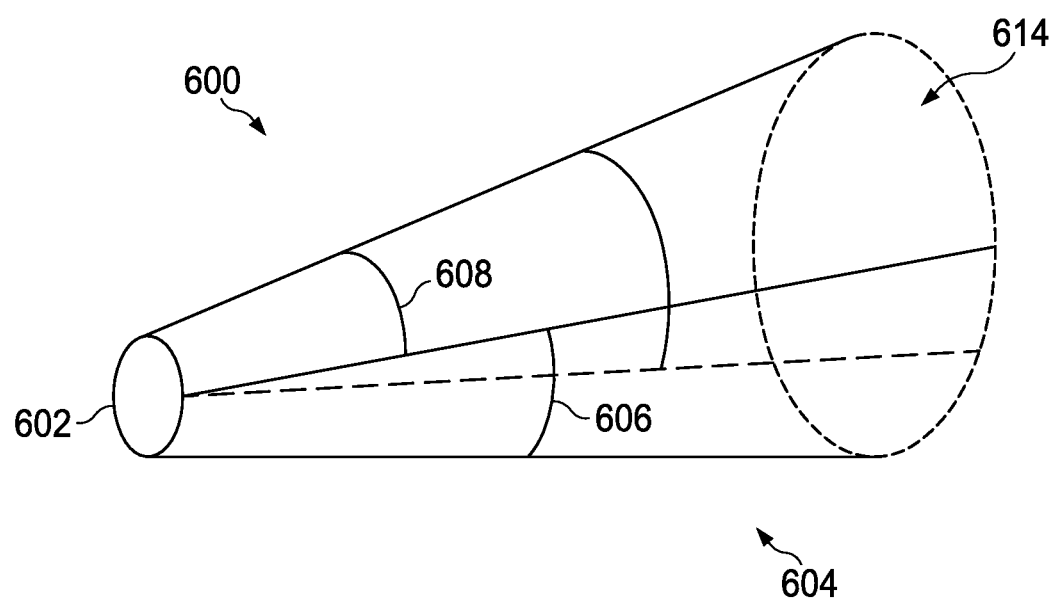
FIG. 6 is an illustration of a field of view for a training device in accordance with an advantageous embodiment.

With reference now to FIG. 6, an illustration of a field of view for a training device is depicted in accordance with an advantageous embodiment. In this depicted example, field of view 600 is a field of view for training device 602. In particular, field of view 600 may be for optics for training device 602. Field of view 600 is the extent of the observable portion of live environment 604.

In this illustrative example, field of view 600 is defined by angle 606 and angle 608. Angle 606 represents azimuth angle, and angle 608 represents elevation angle. Angle 606 and angle 608 define volume 614 for field of view 600.

Figure 7:
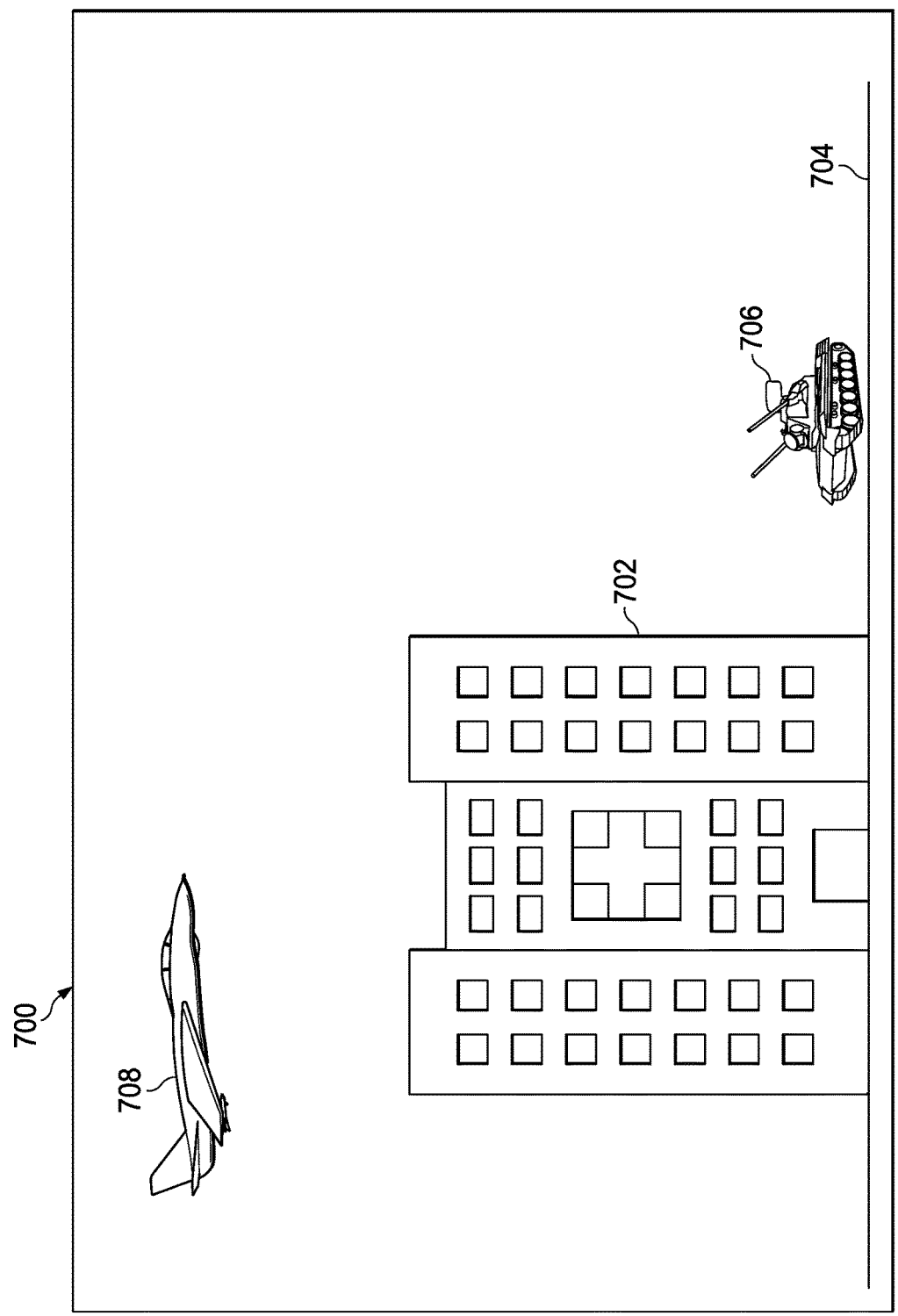
FIG. 7 is an illustration of a display in a viewing system in a training device in accordance with an advantageous embodiment.

With reference now to FIGS. 7-10, illustrations of a presentation of a live environment with simulation objects is depicted in accordance with an advantageous embodiment. Turning first to FIG. 7, an illustration of a display in a viewing system in a training device is depicted in accordance with an advantageous embodiment. In this illustrative example, display 700 is an example of a display that may be presented on viewing system 316 in training device 314 in FIG. 3.

In this illustrative example, building 702 on ground 704 and ground 704 are examples of live objects in a live environment. Ground vehicle 706 and aircraft 708 are examples of simulation objects that are displayed with the presentation of building 702 and ground 704 on a viewing system of a training device.

In this illustrative example, ground vehicle 706 and aircraft 708 are within the field of view of the training device. Neither of these live objects are blocked or obstructed from view by any of the live objects or by each other.

Figure 8:
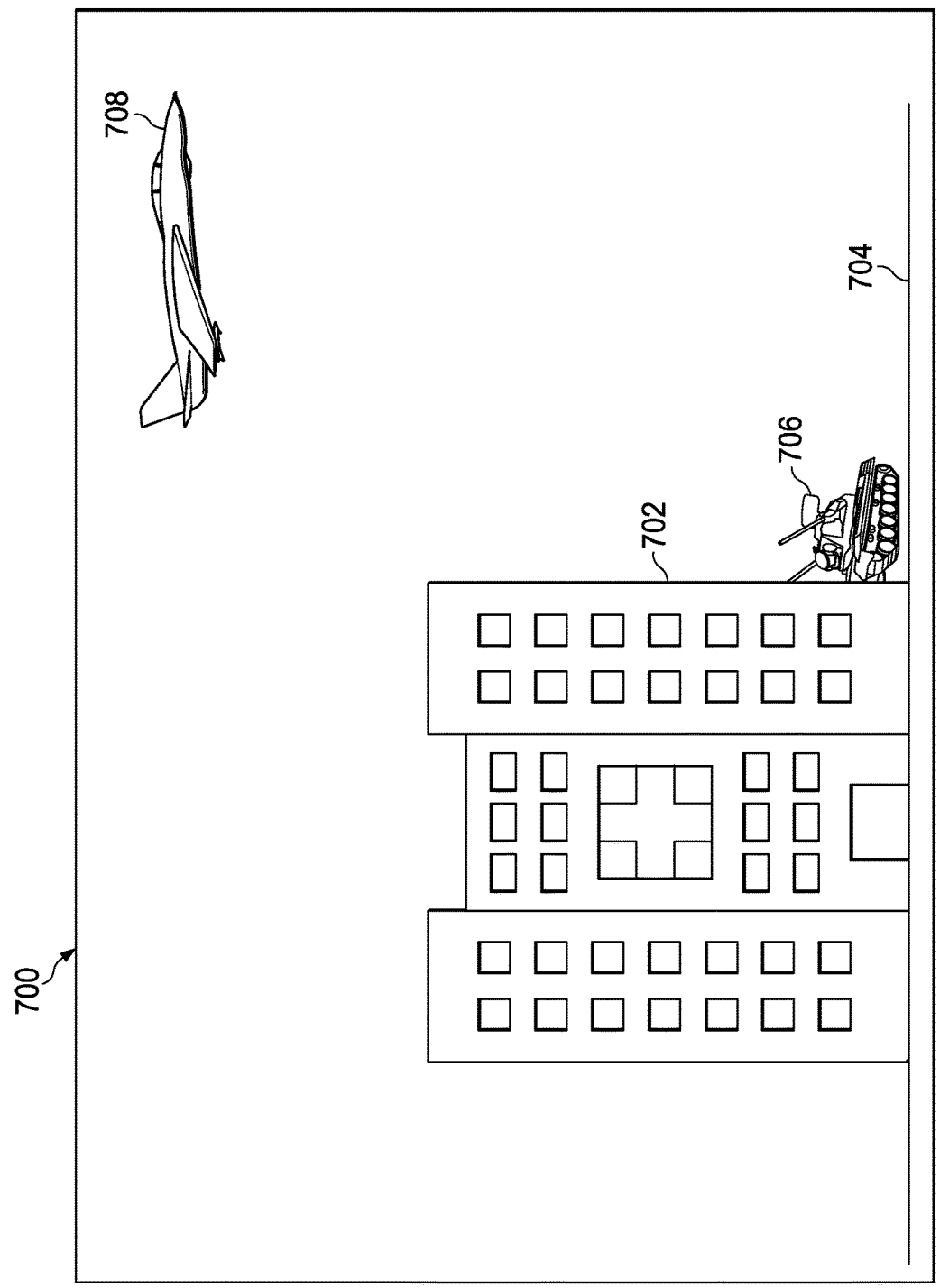
FIG. 8 is an illustration of an occlusion of a simulation object by a live object in accordance with an advantageous embodiment.

In FIG. 8, an illustration of an occlusion of a simulation object by a live object is depicted in accordance with an advantageous embodiment. As can be seen in this example, both ground vehicle 706 and aircraft 708 have moved. The movement of ground vehicle 706 obstructs a portion of ground vehicle 706. Thus, in generating the video data that includes ground vehicle 706, only the portion of ground vehicle 706 not obstructed by building 702 is displayed on display 700. The display of this portion of ground vehicle 706 shows ground vehicle 706 being partially obstructed by building 702.

Figure 9:
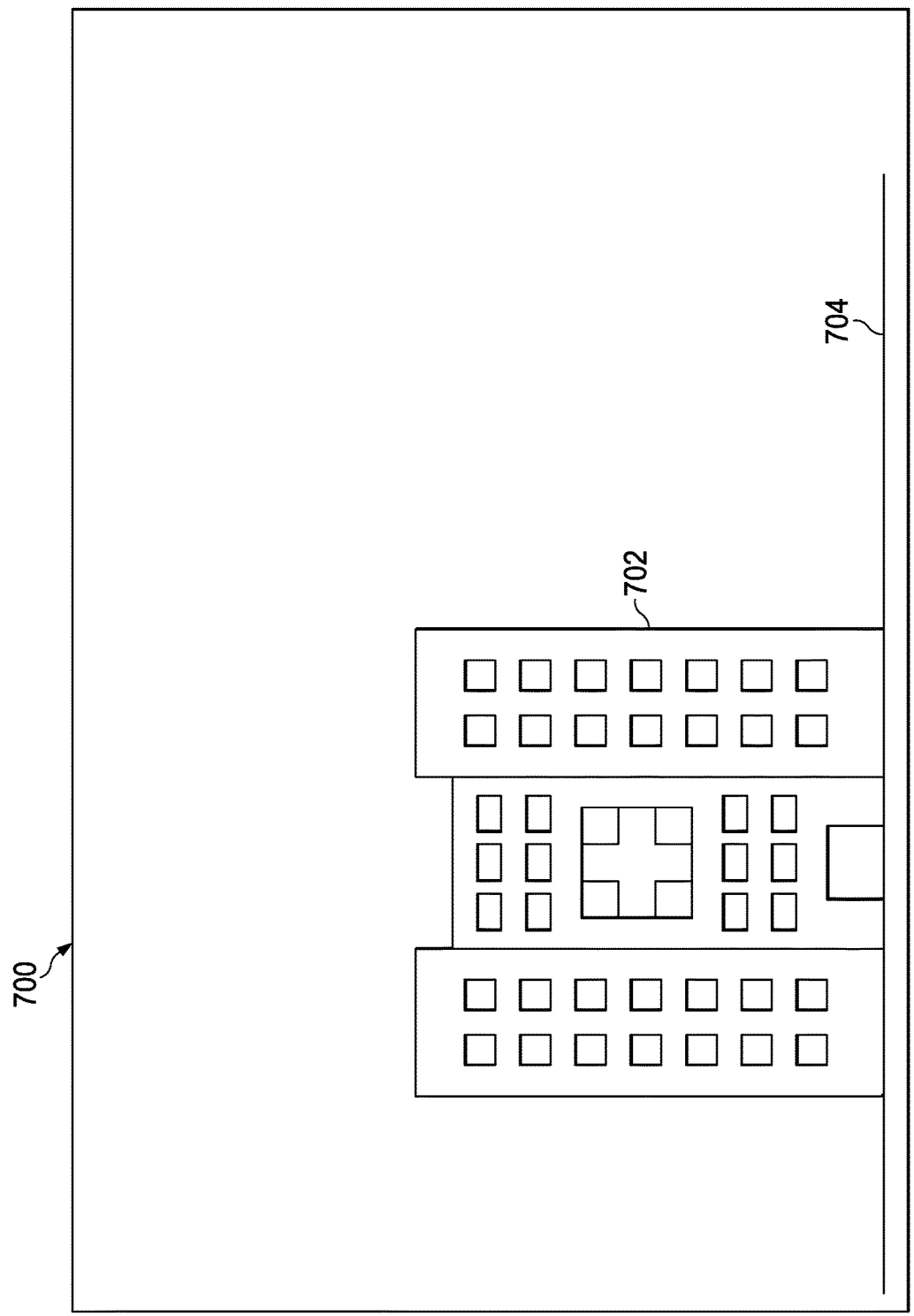
FIG. 9 is another illustration of an occlusion of a simulation object in accordance with an advantageous embodiment.

Turning to FIG. 9, another illustration of an occlusion of a simulation object is depicted in accordance with an advantageous embodiment. In this view, neither ground vehicle 706 nor aircraft 708 are seen in display 700. Ground vehicle 706 is fully occluded by building 702 in this example. Aircraft 708 has moved from the field of view of the training device.

Figure 10:
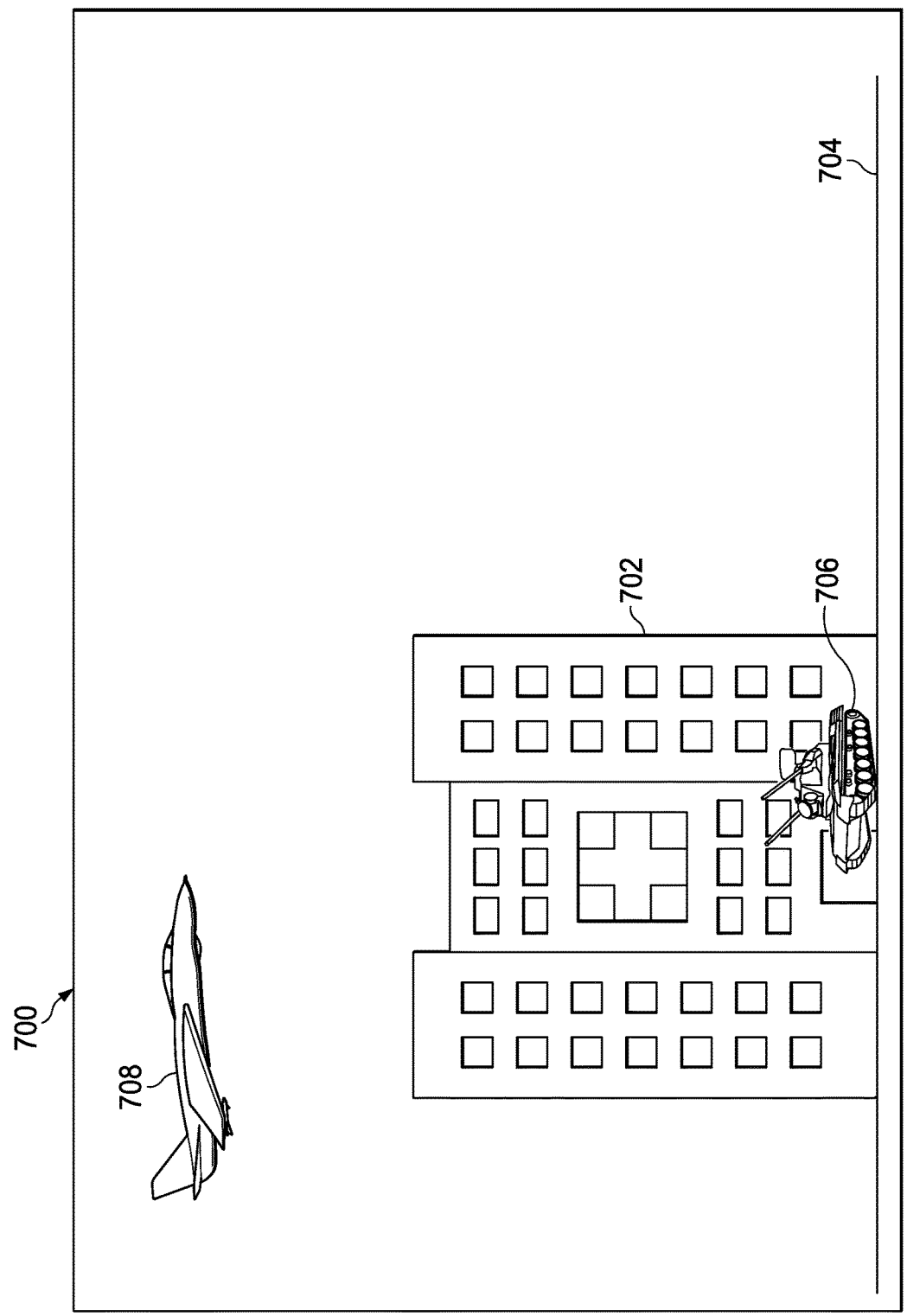
FIG. 10 is an illustration of an occlusion of a portion of a live object by a simulation object in accordance with an advantageous embodiment.

With reference now to FIG. 10, an illustration of an occlusion of a portion of a live object by a simulation object is depicted in accordance with an advantageous embodiment. As depicted, ground vehicle 706 occludes a portion of building 702. Ground vehicle 706 is fully visible when located in between building 702 and the training device.

The illustration of display 700 in FIGS. 7-10 is not meant to imply physical or architectural limitations to the manner in which different advantageous embodiments may be implemented. Display 700 is an example of one display that may be presented on viewing system 316 in training device 314 in FIG. 3.

In other illustrative examples, display 700 may include information about the objects being displayed. This information may include, for example, distance to different objects. In still other illustrative examples, the display may identify live and simulation objects.

Figure 11:
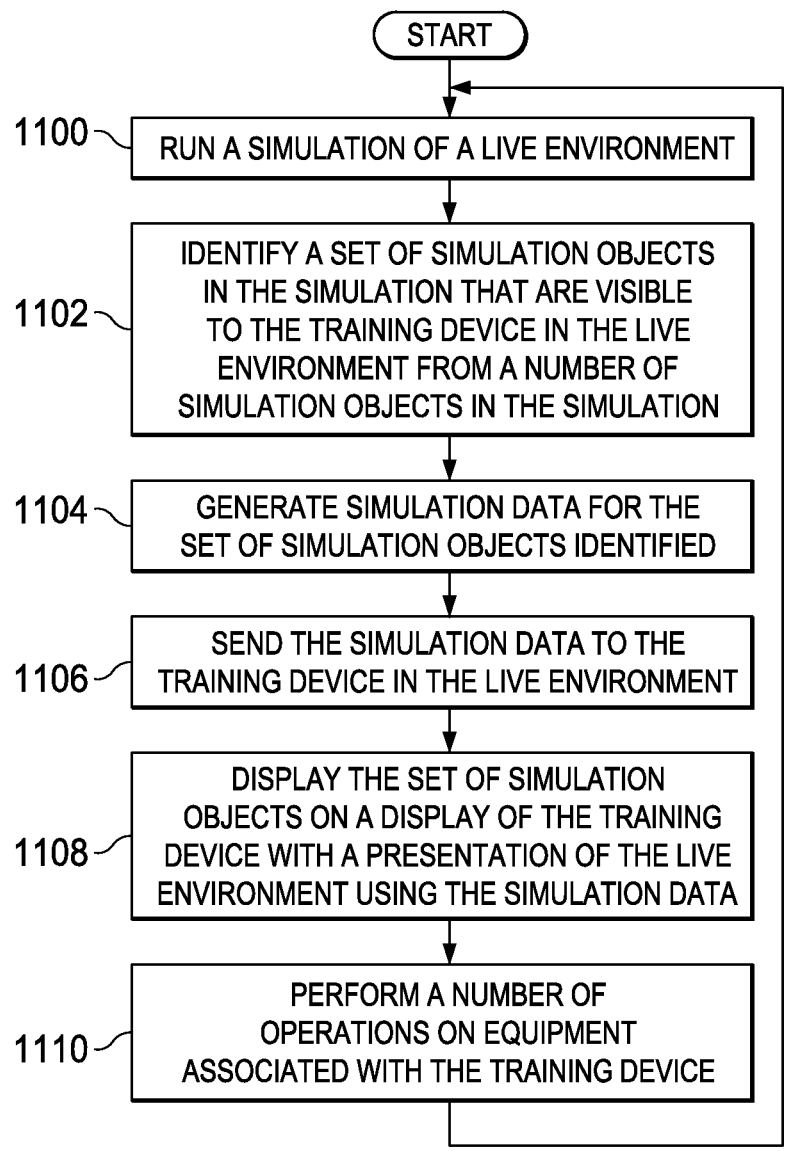
FIG. 11 is a flowchart of a process for displaying simulation objects with a live environment in accordance with an advantageous embodiment.

With reference now to FIG. 11, a flowchart of a process for displaying simulation objects with a live environment is depicted in accordance with an advantageous embodiment. The process illustrated in FIG. 11 may be implemented in a training environment, such as training environment 100 in FIG. 1, to perform training of operators on equipment.

The process begins by running a simulation of a live environment (operation 1100). The simulation in operation 1100 is run, while a training device is present in the live environment. The process then identifies a set of simulation objects in the simulation that are visible to the training device in the live environment from a number of simulation objects in the simulation (operation 1102). In this operation, the set of simulation objects is identified using the position of the training device and a number of positions of the number of simulation objects.

Simulation data is then generated for the set of simulation objects identified (operation 1104). In this operation, the simulation data is generated such that the set of simulation objects can be displayed on a presentation of the live environment on the training device. The process then sends the simulation data to the training device in the live environment (operation 1106).

Next, the process displays the set of simulation objects on a display of the training device with a presentation of the live environment using the simulation data (operation 1108). The operator of the training device then performs a number of operations on equipment associated with the training device (operation 1110), with the process then returning to operation 1100. This process may continue until the training is completed.

Figure 12:
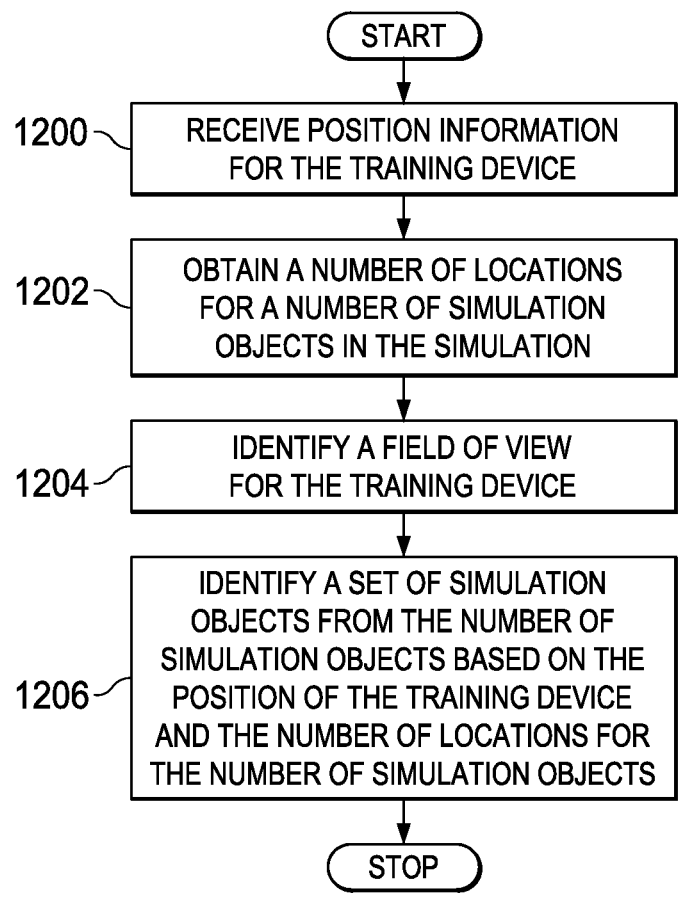
FIG. 12 is an illustration of a flowchart of a process for identifying simulation objects that can be seen by a training device in accordance with an advantageous embodiment.

With reference now to FIG. 12, an illustration of a flowchart of a process for identifying simulation objects that can be seen by a training device is depicted in accordance with an advantageous embodiment. In this illustrative example, the process illustrated in FIG. 12 may be an example of one implementation of operation 1102 in FIG. 11. This process may be implemented in number of simulation applications 114 in FIG. 1, rendering system 400 in FIG. 4, or a combination of the two.

The process begins by receiving position information for the training device (operation 1200). The position information includes a location and orientation of a training device. In particular, this position information is for the viewing system in the training device in these examples.

The process then obtains a number of locations for a number of simulation objects in the simulation (operation 1202). The process then identifies a field of view for the training device (operation 1204). The field of view may be identified from a profile for the particular training device in use. This profile may be, for example, profile 432 in training device database 430 in FIG. 4. Further, in this depicted example, the field of view that is identified is the field of view for the optics of the training device. For example, the field of view may be for optics 332 for training device 314 in FIG. 3.

Thereafter, the process identifies a set of simulation objects from the number of simulation objects based on the position of the training device and the number of locations for the number of simulation objects (operation 1206). With the orientation of the training device, the field of view of the training device may be used to determine what simulation objects in the number of simulation objects fall within the field of view of the training device. Depending on the position of the training device and the number of locations for the number of simulation objects, the set of simulation objects may be a null or empty set. In other words, no simulation objects may be within the field of view of the training device in some instances. The process terminates thereafter.

Figure 13:
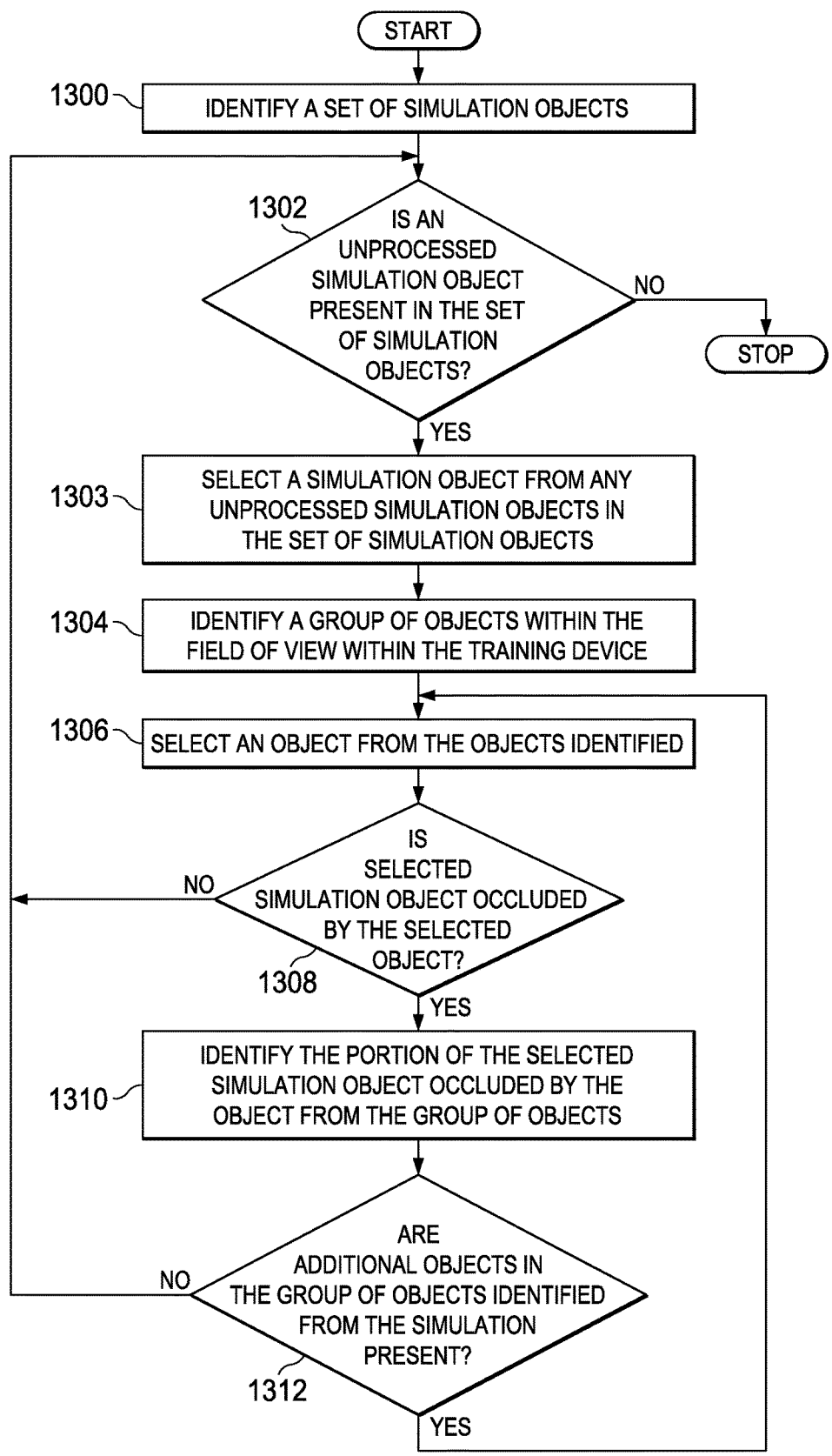
FIG. 13 is a flowchart of a process for identifying occlusions of objects in accordance with an advantageous embodiment.

With reference now to FIG. 13, a flowchart of a process for identifying occlusions of objects is depicted in accordance with an advantageous embodiment. The process illustrated in FIG. 13 may be an example of operations used within operation 1104 in FIG. 11 to generate simulation data for a set of simulation objects. In this illustrative example, this process may be implemented in number of simulation applications 114 in FIG. 1, rendering system 400 in FIG. 4, or a combination of the two.

The process begins by identifying a set of simulation objects (operation 1300). A determination is made as to whether an unprocessed simulation object is present in the set of simulation objects (operation 1302).

If an unprocessed simulation object is present, the process selects a simulation object from any unprocessed simulation objects in the set of simulation objects (operation 1303). Thereafter, the process identifies a group of objects within the field of view within the training device (operation 1304). These objects may include live and/or simulation objects. The simulation includes a simulation of live objects that are present in the live environment with the training device. The process then selects an object from the objects identified (operation 1306).

A determination is made as to whether the selected simulation object is occluded by the selected object (operation 1308). The occlusion may be an occlusion of a portion of the selected simulation object or all of the selected simulation object.

Whether the selected simulation object is occluded by the object in the group of objects may be determined using the position of the training device, the location of the selected simulation object, and the location of the selected object from the group of objects identified in the simulation. If an occlusion is not present, the process returns to operation 1302.

If an occlusion is present, the portion of the selected simulation object occluded by the object from the group of objects is identified (operation 1310). The process then determines whether additional objects in the group of objects identified from the simulation are present (operation 1312).

If additional objects are present in the group, the process returns to operation 1306 to select another object from the group. Otherwise, the process returns to operation 1302. With reference again to operation 1302, if additional objects in the set of objects are not present, the process terminates.

Figure 14:
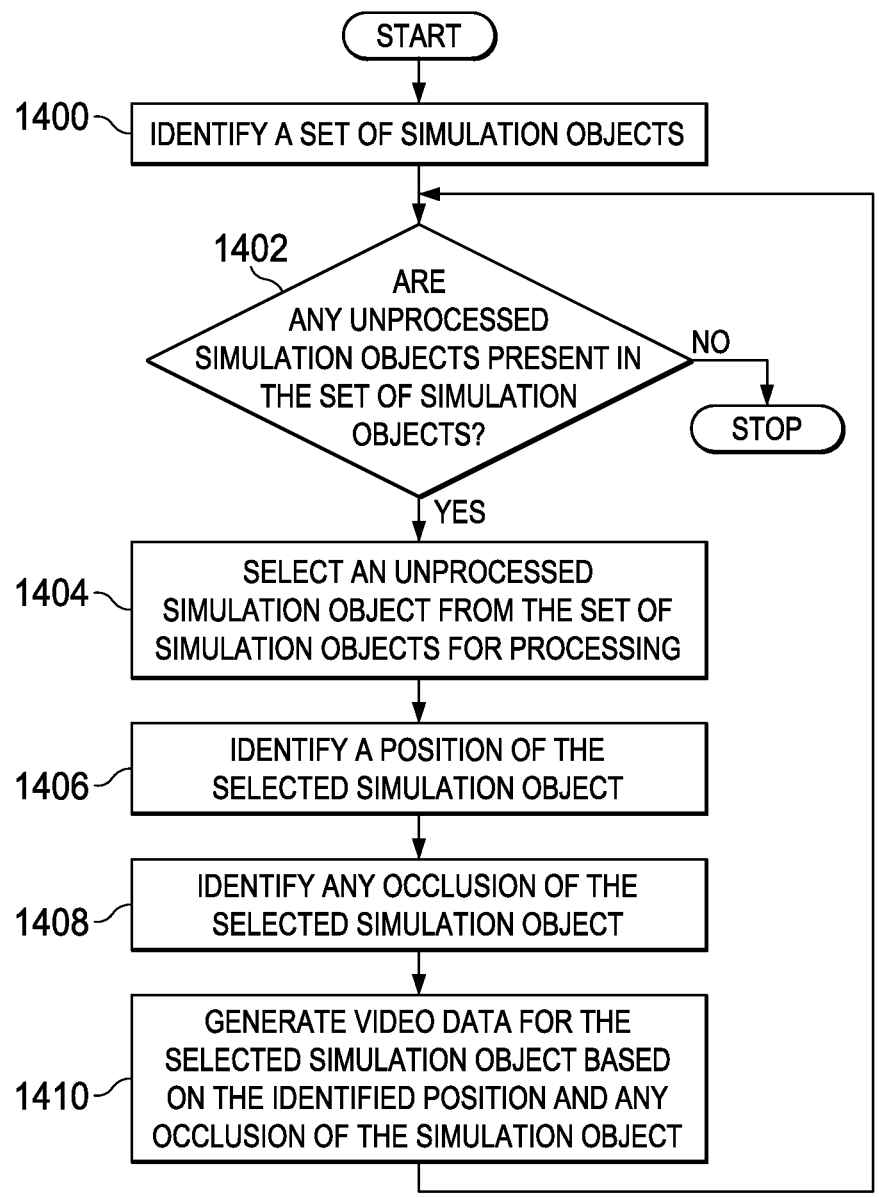
FIG. 14 is an illustration of a flowchart of a process for generating video data for a set of simulation objects in accordance with an advantageous embodiment.

With reference now to FIG. 14, an illustration of a flowchart of a process for generating video data for a set of simulation objects is depicted in accordance with an advantageous embodiment. This process may be an example of operations performed within operation 1104 in FIG. 11 to generate simulation data for a set of simulation objects.

This process may be implemented in number of simulation applications 114 in FIG. 1, rendering system 400 in FIG. 4, or a combination of the two.

The process begins by identifying a set of simulation objects (operation 1400). A determination is made as to whether any unprocessed simulation objects are present in the set of simulation objects (operation 1402). If simulation objects are not present in the set, the process terminates. Otherwise, the process selects an unprocessed simulation object from the set of simulation objects for processing (operation 1404).

The process then identifies a position of the selected simulation object (operation 1406). The position of the selected object relative to the position of the training device is used to identify what portion of the simulation object is displayed. For example, depending on the orientation, the front of the vehicle, the side of the vehicle, a perspective view of the vehicle, or some other view of the vehicle may be generated in the video data.

The process then identifies any occlusion of the selected simulation object (operation 1408). The presence of an occlusion results in the portion of the simulation object that is occluded to not be seen. Only video data is generated for the portion of the simulation object that is not occluded. No video data is generated for the occluded portion of the simulation object in these depicted examples. The process then generates video data for the selected simulation object based on the identified position and any occlusion of the simulation object (operation 1410), with the process returning to operation 1402 as described above.

Figure 15:
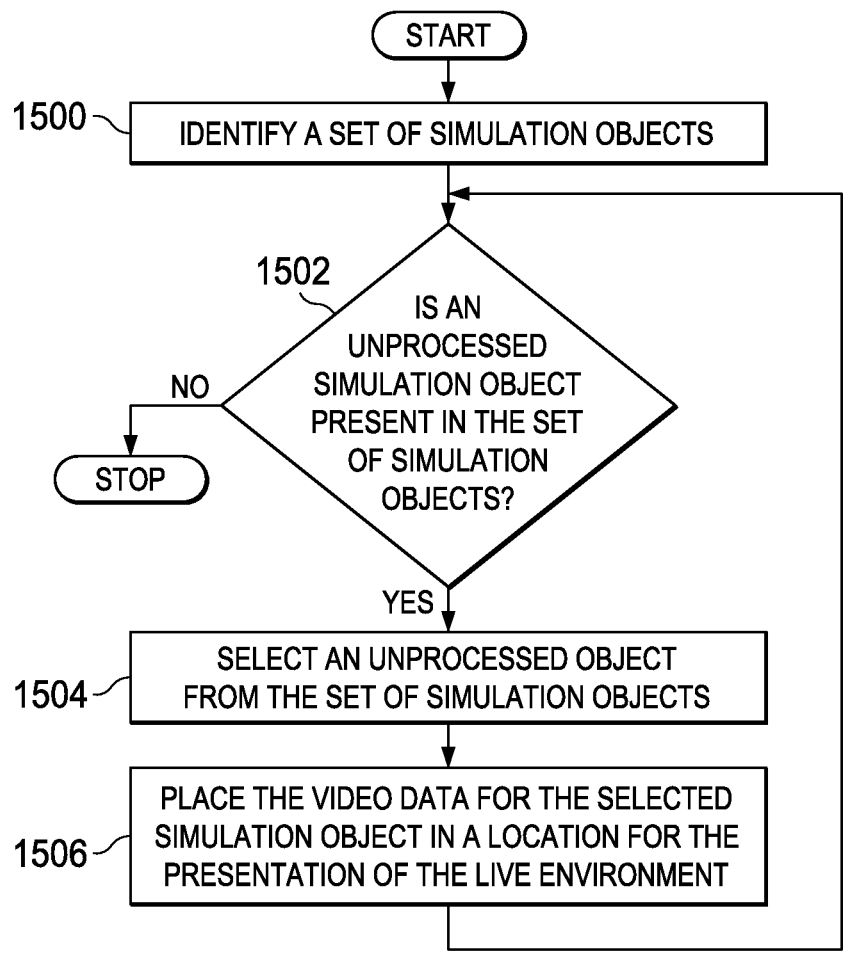
FIG. 15 is an illustration of a flowchart of a process for generating video data in accordance with an advantageous embodiment.

With reference now to FIG. 15, an illustration of a flowchart of a process for generating video data is depicted in accordance with an advantageous embodiment. The process illustrated in FIG. 15 is an example of operations that may be performed in operation 1104 in FIG. 11. The operations in this process may be implemented in number of simulation applications 114 in FIG. 1, rendering system 400 in FIG. 4, or a combination of the two. The process in FIG. 14 may be performed for each frame in the video data.

The process begins by identifying a set of simulation objects (operation 1500). A determination is then made as to whether an unprocessed simulation object is present in the set of simulation objects (operation 1502). If an unprocessed simulation object is not present, the process terminates. Otherwise, the process selects an unprocessed simulation object from the set of simulation objects (operation 1504).

The process then places the video data for the selected simulation object in a location for the presentation of the live environment (operation 1506). This operation may involve combining the video data for the selected simulation object with the frame from the video data for the live environment. Thereafter, the process returns to operation 1502 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for displaying simulation objects. In one illustrative example, a simulation of a live environment is run, while a training device is present in the live environment. A set of simulation objects in the simulation that are visible to the training device in the live environment are identified for a number of simulation objects in the simulation using a position of the training device and a number of positions of the number of simulation objects. Simulation data is generated for the set of simulation objects identified. The simulation data is sent to the training device in a live environment.

This simulation data may then be displayed to present a view of the live environment with the simulation objects included in the view of the live environment. Operators may then train on equipment with the training device in a manner that does not require as many or any live objects.

In this manner, the cost and logistics for moving or transporting live objects, such as aircraft and ground vehicles, to a live environment for training may be reduced. With the use of simulation objects presented with a live environment, a more realistic experience in training may be provided as compared to using simulation systems in a classroom setting.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying simulation objects, the method comprising:
   a computer receiving first video data of a live environment from a training device present in the live environment;
   concurrent with receiving the first video data, the computer running a simulation of the live environment;
   the computer identifying a set of simulation objects in the simulation from a number of simulation objects in the simulation using a position of the training device in which the set of simulation objects is visible to the training device in the live environment;
   the computer generating simulation data for the set of simulation objects, generating simulation data comprising generating graphics for the set of simulation objects;
   the computer combining the graphics for the set of simulation objects with the first video data of the live environment to form second video data; and
   the computer displaying the second video data on a display of the training device.

2. The method of claim 1 further comprising:
   the computer determining whether a portion of a simulation object in the set of simulation objects is obscured in a field of view of the training device in the live environment; and
   responsive to a determination that the portion of the simulation object is obscured in the field of view of the training device, the computer generating the simulation data for the simulation object based on the portion of the simulation object that is obscured.

3. The method of claim 2, wherein the step of determining whether the portion of the simulation object in the set of simulation objects is obscured in the field of view of the training device in the live environment comprises:
   the computer determining whether the portion of the simulation object in the set of simulation objects is obscured in the field of view of the training device in the live environment by at least one of another simulation object and a live object in the live environment.

4. The method of claim 1, wherein the step of the computer identifying the set of simulation objects in the simulation from the number of simulation objects in the simulation using the position of the training device in which the set of simulation objects is visible to the training device in the live environment comprises:
   the computer identifying a field of view of the training device; and
   the computer identifying each simulation object in the simulation in the field of view as being in the set of simulation objects.

5. The method of claim 4, wherein the step of the computer identifying the field of view of the training device comprises:
   the computer receiving video data from the training device, wherein the video data is for a portion of the live environment that is visible to the training device; and
   the computer identifying the field of view for optics for the training device from the video data.

6. The method of claim 4, wherein the step of the computer identifying the field of view of the training device comprises:
   the computer identifying the field of view of the training device from a profile for the training device.

7. The method of claim 1 further comprising:
   responsive to a change in the position of the training device, the computer identifying a new set of simulation objects that is visible to the training device in the live environment.

8. The method of claim 1 further comprising:
   the computer displaying the set of simulation objects on a display of the training device with the live environment using the simulation data.

9. The method of claim 1, wherein the simulation objects simulate at least one of aircraft and ground vehicles.

10. The method of claim 1 wherein the computer identifies the simulation objects during a training session for a joint terminal attack controller (JTAC).

11. The method of claim 1, wherein the position of the training device comprises an orientation of the training device and a location of the training device.

12. A system for displaying simulation objects, the system comprising:
   a bus;
   a processor connected to the bus;
   a memory connected to the bus, the memory storing program code which, when executed by the processor, performs a computer-implemented method, the program code comprising:
   program code for receiving first video data of a live environment from a training device present in the live environment;
   program code for, concurrent with receiving the first video data, using the processor, running a simulation of the live environment;
   program code for identifying a set of simulation objects in the simulation from a number of simulation objects in the simulation using a position of the training device in which the set of simulation objects is visible to the training device in the live environment;
   program code for generating simulation data for the set of simulation objects, generating simulation data comprising generating graphics for the set of simulation objects;
   program code for combining the graphics for the set of simulation objects with the first video data of the live environment to form second video data; and
   program code for displaying the second video data on a display of the training device.

13. The system of claim 12, further comprising:
program code for determining whether a portion of a simulation object in the set of simulation objects is obscured in a field of view of the training device in the live environment; and
program code for, responsive to a determination that the portion of the simulation object is obscured in the field of view of the training device, generating the simulation data for the simulation object based on the portion of the simulation object that is obscured.

14. The system of claim 13, wherein the program code for determining whether the portion of the simulation object in the set of simulation objects is obscured in the field of view of the training device in the live environment comprises:
program code for determining whether the portion of the simulation object in the set of simulation objects is obscured in the field of view of the training device in the live environment by at least one of another simulation object and a live object in the live environment.

15. The system of claim 12, wherein the program code for identifying the set of simulation objects in the simulation from the number of simulation objects in the simulation using the position of the training device in which the set of simulation objects is visible to the training device in the live environment comprises:
program code for identifying a field of view of the training device; and
program code for identifying each simulation object in the simulation in the field of view as being in the set of simulation objects.

16. The system of claim 15, wherein the program code for identifying the field of view of the training device comprises:
program code for receiving video data from the training device, wherein the video data is for a portion of the live environment that is visible to the training device; and
program code for identifying the field of view for optics for the training device from the video data.

17. The system of claim 15, wherein the program code for identifying the field of view of the training device comprises:
program code for identifying the field of view of the training device from a profile for the training device.

18. A non-transitory computer readable storage medium storing program code executable on a computer, the program code comprising:
computer usable program code for receiving first video data of a live environment from a training device present in the live environment;
computer usable program code for, concurrent with receiving the first video data, running a simulation of the live environment,
computer usable program code for identifying a set of simulation objects in the simulation from a number of simulation objects in the simulation using a position of the training device in which the set of simulation objects is visible to the training device in the live environment;
computer usable program code for generating simulation data for the set of simulation objects, generating simulation data comprising generating graphics for the set of simulation objects; and
computer usable program code for combining the graphics for the set of simulation objects with the first video data of the live environment to form second video data; and
computer usable program code for displaying the second video data on a display of the training device.

19. The non-transitory computer readable storage medium of claim 18 wherein the program code further comprises:
computer usable program code for determining whether a portion of a simulation object in the set of simulation objects is obscured in a field of view of the training device in the live environment; and
computer usable program code for responsive to a determination that the portion of the simulation object is obscured in the field of view of the training device, generating the simulation data for the simulation object based on the portion of the simulation object that is obscured.

20. The non-transitory computer readable storage medium of claim 18, wherein the computer usable program code for determining whether the portion of the simulation object in the set of simulation objects is obscured in the field of view of the training device in the live environment comprises:
computer usable program code for determining whether the portion of the simulation object in the set of simulation objects is obscured in the field of view of the training device in the live environment by at least one of another simulation object and a live object in the live environment.

* * * * *